(12) United States Patent
Onishi et al.

(10) Patent No.: US 7,036,150 B2
(45) Date of Patent: Apr. 25, 2006

(54) DATA MANAGEMENT APPARATUS, STORAGE MEDIUM HAVING STORED THEREIN DATA MANAGEMENT PROGRAM, STORAGE MEDIUM HAVING STORED THEREIN USAGE CERTIFICATE DATA, AND METHOD OF USING DATA

(75) Inventors: Joji Onishi, Suwa (JP); Mikio Aoki, Suwa (JP); Shinya Taniguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 869 days.

(21) Appl. No.: 09/876,055

(22) Filed: Jun. 8, 2001

(65) Prior Publication Data
US 2003/0149667 A1 Aug. 7, 2003

(30) Foreign Application Priority Data
Jun. 9, 2000 (JP) ............................. 2000-173554

(51) Int. Cl.
*G06F 12/14* (2006.01)
*H04L 9/32* (2006.01)
(52) U.S. Cl. .......................................... 726/28; 726/29
(58) Field of Classification Search ................. 705/51, 705/52, 57, 59; 713/189, 193; 380/278
See application file for complete search history.

(56) References Cited

U.S. PATENT DOCUMENTS

| | | | |
|---|---|---|---|
| 5,805,804 A * | 9/1998 | Laursen et al. | ............. 709/223 |
| 5,892,900 A * | 4/1999 | Ginter et al. | ................ 713/200 |
| 6,226,618 B1 * | 5/2001 | Downs et al. | .................. 705/1 |
| 6,314,521 B1 | 11/2001 | DeBry | |
| 6,385,728 B1 | 5/2002 | DeBry | |

FOREIGN PATENT DOCUMENTS

| | | |
|---|---|---|
| JP | A-10-177554 | 6/1998 |
| JP | 11-146118 | 5/1999 |
| JP | 11-194903 | 7/1999 |
| JP | 11-237969 | 8/1999 |
| JP | A-11-225155 | 8/1999 |
| JP | A-11-338933 | 12/1999 |
| JP | A-2000-30154 | 1/2000 |

OTHER PUBLICATIONS

Torenrud, T., "Stanford Web Security Service Proposal," Nov. 11, 1996, available at http:///www.stanford.edu/~torg/WW-security.doc.html.*
U.S. Appl. No. 09/877,210, filed Jun. 11, 2001, Onishi et al.

* cited by examiner

*Primary Examiner*—Gregory Morse
*Assistant Examiner*—John Elmore
(74) *Attorney, Agent, or Firm*—Oliff & Berridge, PLC (57) ABSTRACT

The invention provides a data management apparatus which can use data advantageously in terms of data capacity. A database server performs a registration process and a providing process. When a data registration request is received from a seller, the registration process registers audio data included in the received data registration request in association with data name information, password information, and the like. At the same time, the registration process transmits usage certificate data that includes the information to a user. When a data usage request is received from a portable terminal, and when a password of a record in which the same data name as that included in the received data usage request is registered matches a password included in the received data usage request, the providing process transmits audio data specified by the data name included in the received data usage request to the portable terminal.

12 Claims, 7 Drawing Sheets

110 USAGE CERTIFICATE DATA REGISTRATION TABLE

| DATA NAME | PASSWORD | USAGE COUNT | EXPIRATION DATE |
|---|---|---|---|
| RECEIPT DATA 1 | xxxxabcd | 1 | 2000/3/31 |
| RECEIPT DATA 2 | yyyybcde | 1 | 2000/4/30 |
| ≈ | ≈ | ≈ | ≈ |
| RECEIPT DATA n | zzzzcdef | 1 | 2000/5/31 |

USAGE CERTIFICATE DATA

- DATA NAME INFORMATION — 121
- PASSWORD INFORMATION — 122
- USAGE COUNT INFORMATION — 123
- EXPIRATION DATE INFORMATION — 124
- ADDRESS INFORMATION — 125
- PROGRAM CALLING INFORMATION — 126

DATA MANAGEMENT APPARATUS, STORAGE MEDIUM HAVING STORED THEREIN DATA MANAGEMENT PROGRAM, STORAGE MEDIUM HAVING STORED THEREIN USAGE CERTIFICATE DATA, AND METHOD OF USING DATA

BACKGROUND OF THE INVENTION

1. Field of Invention

The present invention relates to apparatuses, storage media, and methods for using various data, such as audio data and video data, using computer systems, and more specifically, relates to a data management apparatus which can use data advantageously in terms of data capacity, a storage medium having stored therein a data management program, a storage medium having stored therein usage certificate data, and a method of using data.

2. Description of Related Art

A delivery service has been offered on a network, such as the Internet or the like, in which audio data of music performed by a famous artist or video data for a movie can be downloaded to a user's terminal under the condition that a user pays a predetermined fee.

The delivery service is implemented by a seller's WWW (World Wide Web) server. The seller's WWW server stores many pieces of audio data and the like. When a user accesses the WWW server for the first time, the user is required to input name, address, credit card number, and the like, and hence the user is registered. At the same time, the seller's WWW server issues an ID and password to the user. The user uses the issued ID and password to access the seller's WWW server, and downloads desired audio data or the like to the user's terminal. When the seller's WWW server is accessed by the user, the seller's WWW server authenticates the user based on the ID and password input by the user. When audio data or the like is downloaded, the seller's WWW server refers to the credit card number specified by the ID input by the user, and deducts a predetermined charge from a user's account.

In recent years, it has been possible to use various data, including audio data and the like, by using portable terminals, such as cellular phones and the like. For example, i-mode offered by NTT Communications Network, Inc. (NTT DoCoMo) leads in this field.

When the user uses the above delivery service to access audio data or the like by a portable terminal, the user generally stores the data in the portable terminal for a while and enjoys playing the data several times, since the user has paid a charge to purchase the data. Also, the user may want to store not only a single piece of audio data but also several pieces of audio data in the portable terminal and to enjoy various data.

When using audio data or the like with the portable terminal, the number of pieces of data that can be stored in the portable terminal is limited, since it is difficult to install a large-capacity memory in the portable terminal due to issues of cost reduction and size. Specifically, audio data or the like is much larger than document data, such as text data or the like. In fact, it may be impossible to store a single piece of audio data that requires a few hours to be played.

SUMMARY OF THE INVENTION

In view of the unsolved problems encountered with such conventional techniques, it is an object of the present invention to provide a data management apparatus capable of using data while being advantageous in terms of data capacity, a storage medium having stored therein a data management program, a storage medium having stored therein usage certificate data, and a method of using data.

In order to achieve the foregoing objects, a data management apparatus of the present invention registers, in response to a data registration request which includes usage data to be used, the usage data and provides, in response to a data usage request, the usage data regarding the data usage request. The data management apparatus includes a storage device that provides registration of the usage data; a registration device that registers the usage data in the storage device; and a providing device that provides the usage data in the storage device. When the data registration request is received, the registration device registers the usage data included in the received data registration request in the storage device, in association with authentication information for authenticating whether or not a user is eligible to use the usage data, and the registration device transmits usage certificate data that includes the authentication information. When the data usage request which includes the authentication information is received, and when the authentication information in the storage device which corresponds to the usage data regarding the received data usage request and the authentication information included in the received data usage request satisfy a predetermined relationship, the providing device transmits the usage data in the storage device regarding the received data usage request.

With this arrangement, for example, when a user wants to use data provided by a provider, the provider first transmits a data registration request including usage data to be used to the data management apparatus.

When the data registration request is received, the data management apparatus uses the registration device to register the usage data included in the received data registration request in the storage device, in association with authentication information for authenticating whether or not the user is eligible to use the usage data. Also, usage certificate data including the authentication information is transmitted. Then, the user receives the transmitted usage certificate data and obtains the authentication information.

Next, the user refers to the authentication information included in the usage certificate information and transmits a data usage request including the authentication information to the data management apparatus.

When the data usage request is received, and when the authentication information in the storage device which corresponds to the usage data regarding the received data usage request and the authentication information included in the received data usage request satisfy a predetermined relationship, the data management apparatus uses the providing device to transmit the usage data in the storage device regarding the received data usage request. The transmitted usage data is used by the destination. For example, forms of usage include displaying, printing, and playing.

By storing the usage certificate including the authentication information, instead of the data itself, in the user's terminal, the user can use the data at any location, if necessary.

In the storage device, usage data is registered by every method on every occasion. Alternatively, it is possible to register the usage data beforehand in the storage device. Also, without registering the usage data in advance, it is possible to register the usage data in response to an external input or the like when the apparatus is operating.

For example, a predetermined relationship is said to be satisfied when authentication information for a checked object matches authentication information for a checking object, when the result of an operation using a predetermined arithmetic expression based on the authentication information for the checking object matches the authentication information in the checked object, or when the result of an operation using a predetermined arithmetic expression based on the authentication information for the checked object matches the result of a calculation using a predetermined arithmetic expression based on the authentication information in the checking object. Hereinafter, the same applies to the storage medium having stored therein a data management program and to a method of using data.

As long as the registration device is designed to directly or indirectly transmit usage certificate data to a user, the registration device can be of any structure. For example, usage certificate data can be directly transmitted to the user by transmitting the usage certificate data to a user's terminal. Also, the usage certificate data can be transmitted to a provider's terminal, and then the provider's terminal transmits the usage data to the user's terminal. In this way, the usage certificate data is indirectly transmitted to the user. Hereinafter, the same applies to the storage medium having stored therein a data management program and the method of using data.

As long as the providing device is designed to transmit usage data, the providing device can be of any structure. For example, any providing device can be used as long as it directly or indirectly transmits the usage data to a user or an output terminal (a display, printing, or replay terminal). When directly or indirectly transmitting usage data to a user or an output terminal, the procedure is similar to that described in the example of the registration device. Hereinafter, the same applies to the storage medium having stored therein a data management program and to the method of using data.

The data management apparatus according to the present invention can be formed of one terminal or a set of functions of terminals. For example, when the data management apparatus includes a set of functions of two terminals, the structure is as follows. Specifically, one terminal includes a storage device and a providing device, and the other terminal includes a registration device that registers usage data in the storage device of one terminal.

In the data management apparatus of another aspect of the present invention, the registration device registers the usage data included in the received data registration request in the storage device, in association with usage count information which indicates the number of times the usage data is permitted to be used. When a usage count in the usage count information in the storage device which corresponds to the usage data regarding the received data usage request is less than or equal to a predetermined number, the providing device is prohibited from transmitting the usage data.

With this arrangement, when a data registration request is received, the registration device registers the usage data included in the received data registration request in the storage device, in association with usage count information indicating the number of times the usage data is permitted to be used.

In contrast, when a data usage request is received, and when a usage count in the usage count information in the storage device which corresponds to the usage data regarding the received data usage request is greater than a predetermined number, the providing device transmits the usage data in the storage device regarding the received data usage request to a print terminal. In contrast, when the usage count in the usage count information in the storage device which corresponds to the usage data regarding the received data usage request is less than or equal to the predetermined number, transmission of the usage data is prohibited.

Thus, the provider can restrict the number of times the user can use the data. It is preferable to apply the present invention to a case in which the usage count is preset in accordance with a fee paid by the user, thus allowing the user to use the data within the range of the present usage count. Also, the present invention is advantageous when it is applied to reducing the possibility of data, which has the property of a certificate or the like, being duplicated a large number of times or being falsified.

In the data management apparatus of another aspect of the present invention, the usage certificate data further includes a network address that uniquely specifies the location of the apparatus on a network to which the apparatus is connected.

With this arrangement, the registration device transmits usage certificate data that includes not only authentication information but also a network address that uniquely specifies the location of the data management apparatus on the network to which the data management apparatus is connected. The user receives the transmitted usage certificate data and obtains the authentication information and the network address.

By referring to the network address included in the usage certificate data, the user can transmit a data usage request including the authentication information to the data management apparatus.

In the data management apparatus of another aspect of the present invention, the usage certificate data further includes a network address that uniquely specifies, on a network, the storage location of a program for transmitting the data usage request which includes the authentication information to the apparatus, the program being stored in the network.

With this arrangement, the registration device transmits usage certificate data which includes not only authentication information but also a network address that uniquely specifies, on the network, the storage location of a program for transmitting a data usage request including the authentication information to the data management apparatus, the program being stored in the network. The user receives the transmitted usage certificate data and obtains the authentication information and the network address.

By referring to the network address included in the usage certificate data, the user reads the program from a network terminal. Using the program, the user can transmit a data usage request including the authentication information to the data management apparatus.

The program stored in the network is a program stored in a network resource connected to the network. For example, the program can be stored in a terminal that establishes a connection through the network with another terminal that attempts to use usage data based on the usage certificate data. Also, the program can be stored in a terminal that attempts to use usage data based on the usage certificate data. Hereinafter the same applies to a storage medium having stored therein usage certificate data.

In a data management apparatus of another aspect of the present invention, when a network address is included in the data registration request, the registration device transmits the usage certificate data to a destination specified by the network address, and, when no network address is included in the data registration request, the registration device transmits the usage certificate data to the sender of the data registration request.

With this arrangement, when a network address is included in a data registration request, the registration device transmits usage certificate data to a destination specified by the network address. In contrast, when no network address is included in a data registration request, the registration device transmits usage certificate data to the sender of the data registration request.

In a data management apparatus of another aspect of the present invention, when a network address is included in the data usage request, the providing device transmits the usage data to a destination specified by the network address, and, when no network address is included in the data usage request, the providing device transmits the usage data to the sender of the data usage request.

With this arrangement, when a network address is included in a data usage request, the providing device transmits usage data to a destination specified by the network address. In contrast, when no network address is included in a data usage request, the providing device transmits usage data to the sender of the data usage request.

In order to achieve the foregoing objects, a storage medium is provided having stored therein a data management program of the present invention that is a computer-readable storage medium having stored therein a data management program to be applied to a data management apparatus as described above. The storage medium stores a program for causing a computer to perform processing implemented by a registration device that registers usage data in a storage device and processing implemented by a providing device that provides the usage data in the storage device. When a data registration request is received, the registration device registers the usage data included in the received data registration request in the storage device, in association with authentication information for authenticating whether or not a user is eligible to use the usage data, and the registration device transmits usage certificate data that includes the authentication information. When a data usage request which includes the authentication information is received, and when the authentication information in the storage means which corresponds to the usage data regarding the received data usage request and the authentication information included in the received data usage request satisfy a predetermined relationship, the providing device transmits the usage data in the storage device regarding the received data usage request.

With this arrangement, the program stored in the storage medium is read by the computer. When the computer performs processing in accordance with the read program, operations equivalent to those of a data management apparatus as set forth above can be obtained.

In order to achieve the foregoing objects, a storage medium is provided having stored therein usage certificate data of the present invention is a computer-readable storage medium having stored therein usage certificate data to be transmitted by a data management apparatus as described above. The storage medium stores authentication information that authenticates, by the data management apparatus, whether or not a user is eligible to use the usage data and a network address that uniquely specifies, on a network, the storage location of a program for transmitting a data usage request which includes the authentication information to the data management apparatus, the program being stored in the network.

With this arrangement, data stored in the storage medium is read by the computer. When the computer performs processing based on the read data, the computer refers to the network address included in the read usage certificate data and reads the program. Using the read program, the computer transmits a data usage request including the authentication information to the data management apparatus.

In order to achieve the foregoing objects, the method of using data of the present invention is a method for using data by a computer system. A provider that provides usage data to be used performs registering the usage data in a storage device in association with authentication information that authenticates whether or not a user is eligible to use the usage data; and transmitting usage certificate information which includes the authentication information to the user of the usage data. The user performs receiving the usage certificate data; and transmitting a data usage request that includes the authentication information. The provider further performs receiving the data usage request; and transmitting the usage data in the storage device regarding the received data usage request when the authentication information in the storage device which corresponds to the usage data regarding the received data usage request and the authentication information included in the received data usage request satisfy a predetermined relationship.

In the method of using data of another aspect of the present invention, the provider further performs registering the usage data in the storage device in association with usage count information which indicates the number of times the usage data is permitted to be used; and prohibiting transmission of the usage data when a usage count in the usage count information in the storage device which corresponds to the usage data regarding the received data usage request is less than or equal to a predetermined number.

DETAILED DESCRIPTION OF PREFERRED EMBODIMENTS

Embodiments of the present invention will now be described with reference to the drawings. FIGS. 1 to 11 illustrate a data management apparatus, a storage medium having stored therein a data management program, a storage medium having stored therein usage certificate data, and a method of using data according to embodiments of the present invention.

Figure 1:
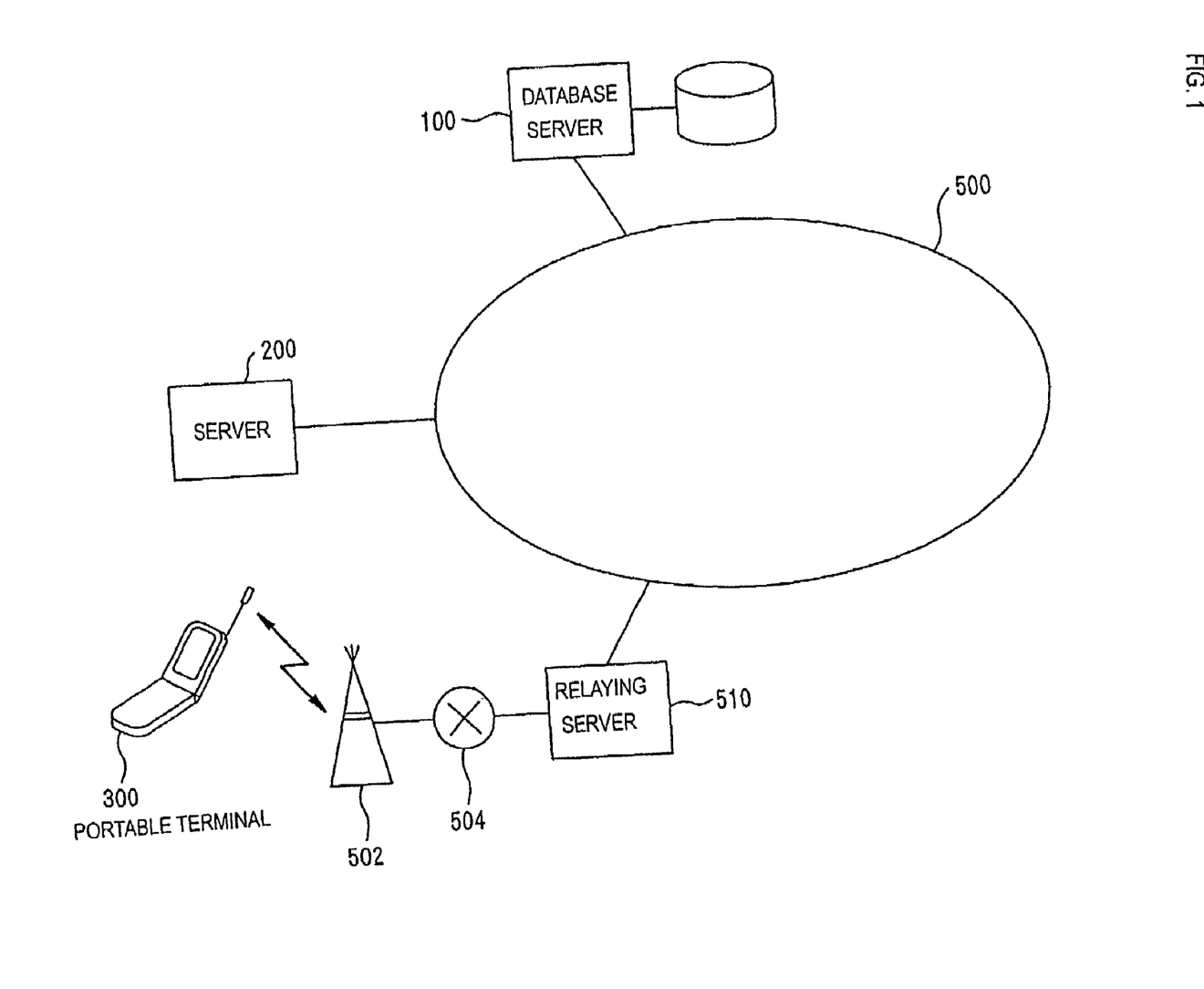
FIG. 1 is a schematic of the configuration of a network system to which the present invention is applied.

In this embodiment, the data management apparatus, the storage medium having stored therein the data management program, the storage medium having stored therein the usage certificate data, and the method of using data according to the present invention are applied to a case in which a user uses a music delivery service offered by a seller to play audio data using a user's portable terminal 300, as shown in FIG. 1. Specifically, the user accesses a seller's server 200 and requests that audio data be provided under the condition that the user pays a predetermined fee. The seller registers the audio data concerning the provision request in a database server 100. At the same time, the seller issues, in place of the audio data, usage certificate data that uses the audio data to the user. When the user wants to play the audio data, the user uses the usage certificate data to download the audio data from the database server 100.

The configuration of a network system to which the present invention is applied will now be described with reference to FIG. 1. FIG. 1 is a schematic of the configuration of the network system to which the present invention is applied.

As shown in FIG. 1, the database server 100 that registers and provides audio data, the seller's server 200, and a relaying server 510 that relays communication between the portable terminal 300 owned by the user and a network 500 are connected to the network 500.

A base station 502 that performs wireless communication with the portable terminal 300 is connected to the relaying server 510 through a public line 504. When the portable terminal 300 establishes a link with the network 500, the relaying server 510 operates in place of the portable terminal 300 as a terminal on the network 500. The relaying server 510 transmits a request or data, which is received from the portable terminal 300 through the base station 502 and the public line 504, to a target terminal through the network 500. At the same time, the relaying server 510 transmits data from the target terminal on the network 500 to the portable terminal 300 through the public line 504 and the base station 502.

The portable terminal 300 includes a CPU, ROM, and RAM that are interconnected by a bus. Also, the portable terminal 300 includes an LCD (Liquid Crystal Display) that displays images, a key panel as a human interface, which can be used to input data using several keys, and a speaker that outputs sound which is played based on the audio data.

The portable terminal 300 transmits and receives email through a mail server (not shown). When a mail transmission request is received from the portable terminal 300, the mail server transmits an email concerning the mail transmission request to a destination specified by a designated email address. Also, the mail server receives and stores an email transmitted from the outside (the database server 100 or the server 200) to the portable terminal 300. In response to a mail delivery request from the portable terminal 300, the mail server delivers the stored email addressed to the portable terminal 300. It is also possible to attach usage certificate data (described hereinafter) to an email, and hence the email with the attachment can be transmitted/received.

Figure 2:
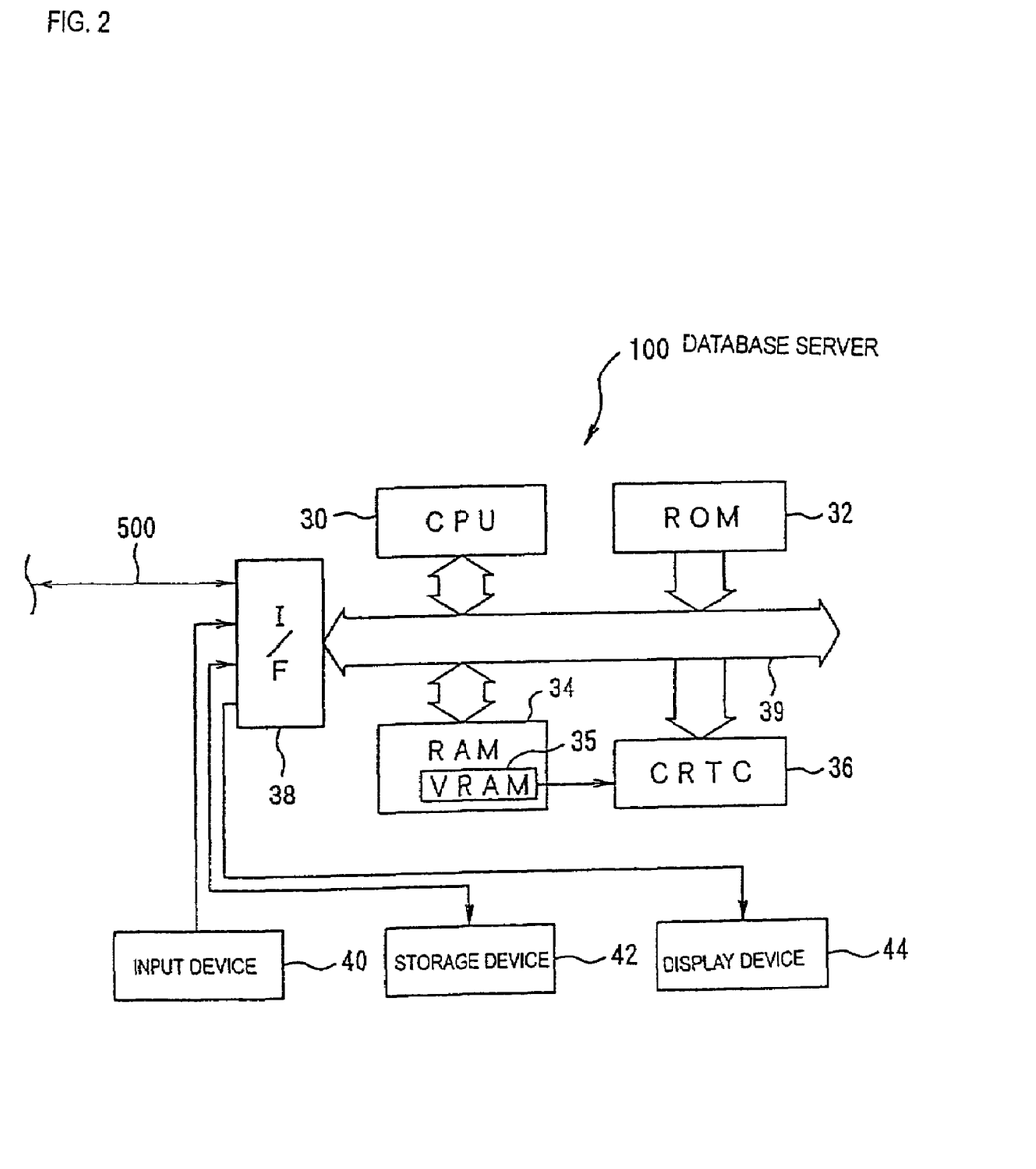
FIG. 2 is a schematic of the structure of a database server 100.

Referring to FIG. 2, the structure of the database server 100 will now be described in detail. FIG. 2 is a schematic of the structure of the database server 100.

As shown in FIG. 2, the database server 100 includes a CPU 30 that performs arithmetic operations and controls the overall system in accordance with a control program; ROM 32 that stores in advance the control program for the CPU 30 or the like in a predetermined region; RAM 34 that stores data read from the ROM 32 or the like and the results of the arithmetic operations which are required in the course of operation of the CPU 30; a CRTC 36 that converts data stored in a specific region of the RAM 34 into image signals and outputs the image signals to a display device 44; and an I/F 38 that carries data input and output with respect to external devices. These devices are interconnected by a bus 39, which is a signal line that transmits data, in which data can be communicated among these devices.

External devices are connected to the I/F 38. The external devices include an input device 40, which includes a keyboard, a mouse, and the like, that function as a human interface and inputting data; a storage device 42 that stores data and tables as files; the display device 44 that displays images based on image signals; and a signal line that establishes a connection with the network 500.

The RAM 34 includes VRAM 35 as a specific region that stores display data to be displayed on the display device 44. The VRAM 35 can be accessed independently by the CPU 30 and the CRTC 36.

The CRTC 36 sequentially reads the display data stored in the VRAM 35 at a predetermined cycle, starting from the first address. The CRTC 36 converts the read display data into image signals and outputs the image signals to the display device 44.

Figure 3:
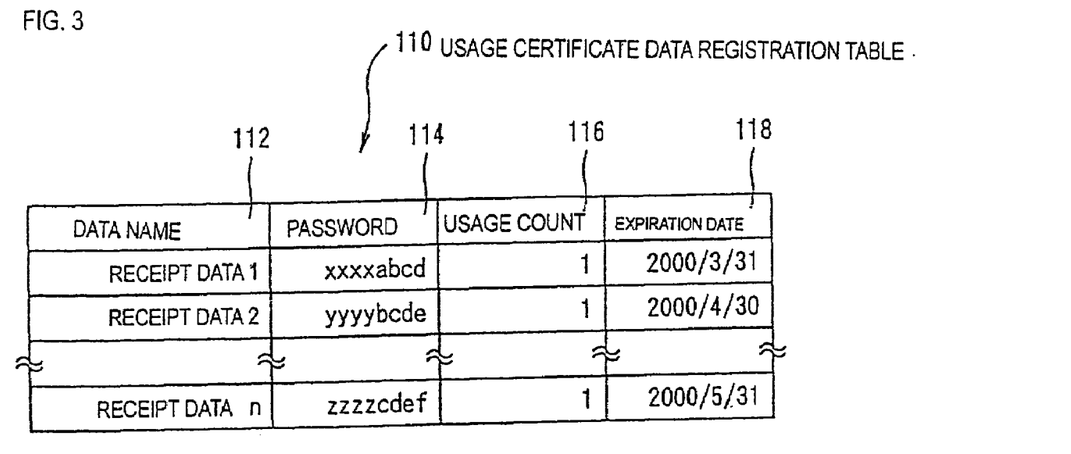
FIG. 3 illustrates the data structure of a usage certificate data registration table 110.

Referring to FIG. 3, the structure of data stored in the storage device 42 will now be described. FIG. 3 illustrates the data structure of the usage certificate data registration table 110.

As shown in FIG. 3, the storage device 42 stores the usage certificate data registration table 110 in which usage certificate data that uses audio data is registered and a program (not shown) which is called based on program calling information included in the usage certificate data (described hereinafter).

In the usage certificate data registration table 110, as shown in FIG. 3, one record is registered for each piece of audio data. Each record includes a field 112 that registers the data name of audio data; a field 114 that registers a password that is required to use the audio data; a field 116 that registers a usage count of the audio data; and a field 118 that registers the expiration date for using audio data. Also, the usage certificate data registration table 110 includes a field (not shown) that registers local information used to specify standard time based on which the expiration date is determined. The local information is, for example, JST (Japan Standard Time) when Japanese standard time is used.

In the example shown in FIG. 3, a first record from the top includes "receipt data 1" as the data name in the field 112, "xxxxabcd" as the password in the field 114, "1" as the usage count in the field 116, and "2000/3/31" as the expiration date in the field 118. The lowest record includes "receipt data n" as the data name in the field 112, "zzzzcdef" as the password in the field 114, "1" as the usage count in the field 116, and "2000/5/31" as the expiration date in the field 118.

In the initial state, no record is registered in the usage certificate data registration table 110. If necessary, the server 200 registers audio data, and a corresponding record is added and is registered.

Figure 4:
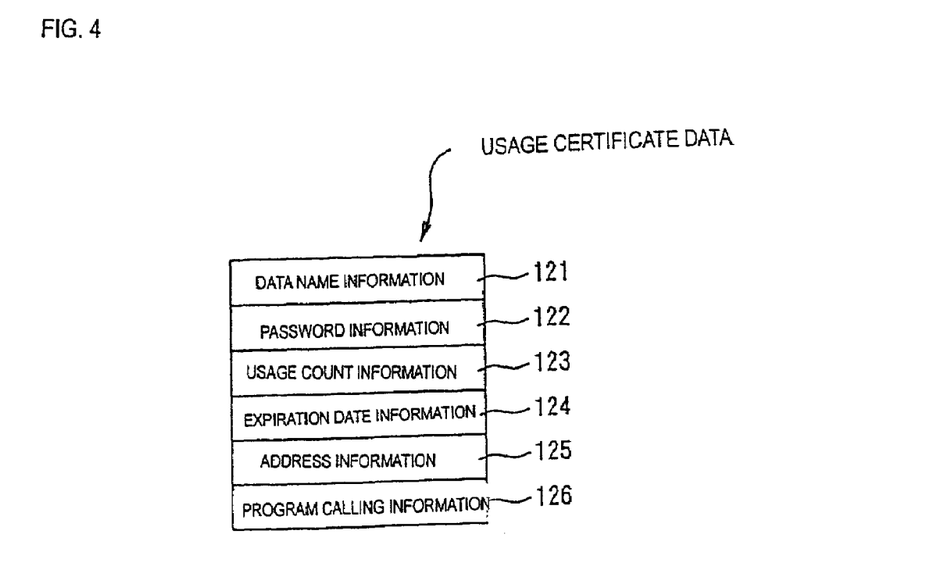
FIG. 4 illustrates the data structure of usage certificate data.

The CPU 30 includes a microprocessing unit MPU or the like. When audio data is registered, as shown in FIG. 4, the CPU 30 issues usage certificate data to a user. FIG. 4 illustrates the data structure of usage certificate data.

As shown in FIG. 4, usage certificate data includes data name information 121 indicating the data name of audio data; password information 122 indicating a password required for using the audio data; usage count information 123 indicating the usage count of the audio data; expiration date information 124 indicating the expiration date of the audio data; address information 125 indicating a network address that uniquely specifies the location of the database server 100 on the network 500; and program calling information 126 required to call a program that transmits a data usage request to the database server 100 based on the usage certificate data. Also, local information (not shown) that specifies standard time, based on which the expiration date is determined, is included.

The program calling information 126 includes a calling program that selectively calls a display program that displays the contents of usage certificate data or a usage request program that transmits a data usage request including the data name information 121 and the password information 122 to the database server 100 and requests the use of audio data. In order to call the programs, the program calling information 126 also includes a network address (network address of the database server 100) that uniquely specifies the storage location to store these programs on the network 500. Both the display program and the usage request program are stored in the storage device 42 as programs that are called based on the program calling information 126.

Figure 5:
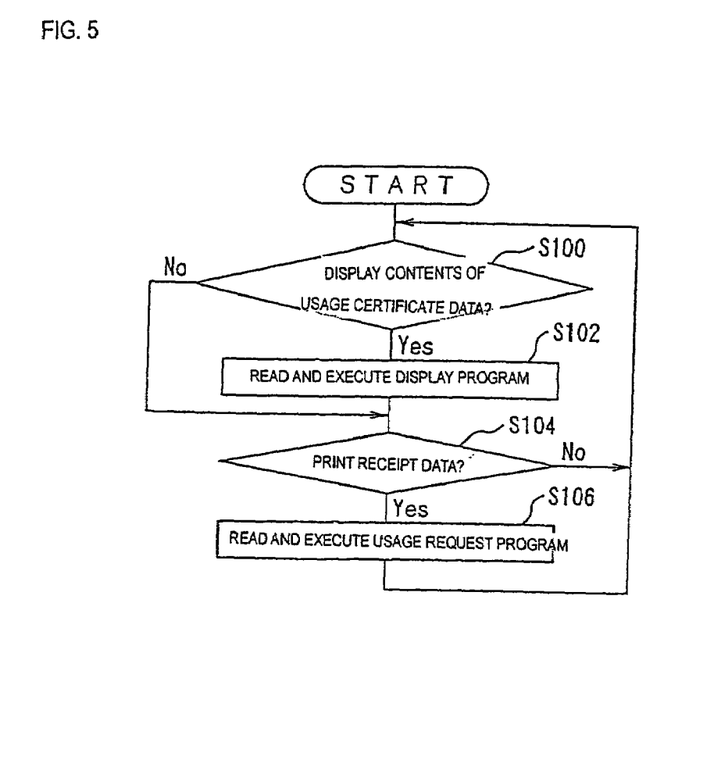
FIG. 5 is a flowchart showing a calling program.

Referring to FIG. 5, the calling program included in the program calling information 126 will now be described in detail. FIG. 5 is a flowchart showing the calling program.

The calling program is a multi-platform program that includes a group of commands (for example, JAVA applets) that are independent of the type of CPU. When the calling program is executed by a terminal on the network 500, as shown in FIG. 5, the calling program proceeds to step S100.

In step S1000, the calling program determines whether or not a request to display the contents of usage certificate data is input. If it is determined that the request to display the contents of usage certificate data is input (Yes), in step S102, the calling program refers to a network address included in the program calling information 126, and the calling program reads and executes the display program from the database server 100. Then, the calling program proceeds to step S104.

In step S104, the calling program determines whether or not a request to play the audio data is input. If it is determined that the request to play the audio data is input (Yes), in step S106, the calling program refers to the network address included in the program calling information 126, and the calling program reads and executes the usage request program from the database server 100. Then, the calling program proceeds to step S100.

In contrast, if it is determined in step S1100 that no request to display the contents of usage certificate data is input (No), the calling program proceeds to step S104.

In contrast, if it is determined in step S104 that no request to play the audio data is input (No), the program proceeds to step S100.

Figure 6:
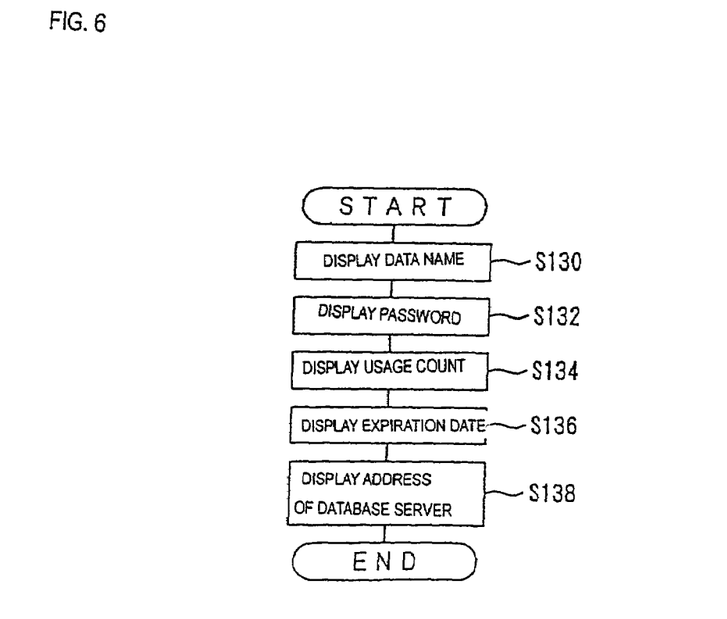
FIG. 6 is a flowchart showing a display program.

Referring to FIG. 6, the display program in the storage device 42 will now be described in detail. FIG. 6 is a flowchart showing the display program.

As in the calling program, the display program is a multi-platform program formed of a group of commands that are independent of the type of CPU. The display program is read by executing the calling program. When the display program is executed by a terminal on the network 500, as shown in FIG. 6, the display program proceeds to step S130.

In step S130, the display program displays the data name of audio data based on the data name information 121 included in the usage certificate data. In step S132, the display program displays a password based on the password information 122 included in the usage certificate data. In step S134, the display program displays the remaining usage count of the audio data based on the usage count information 123 included in the usage certificate data. Subsequently, the display program proceeds to step S136.

In step S136, the display program displays the expiration date of the audio data based on the expiration date information 124 included in the usage certificate data. In step S138, the display program displays a network address of the database server 100 based on the address information 125 included in the usage certificate data. The display program is then terminated.

Figure 7:
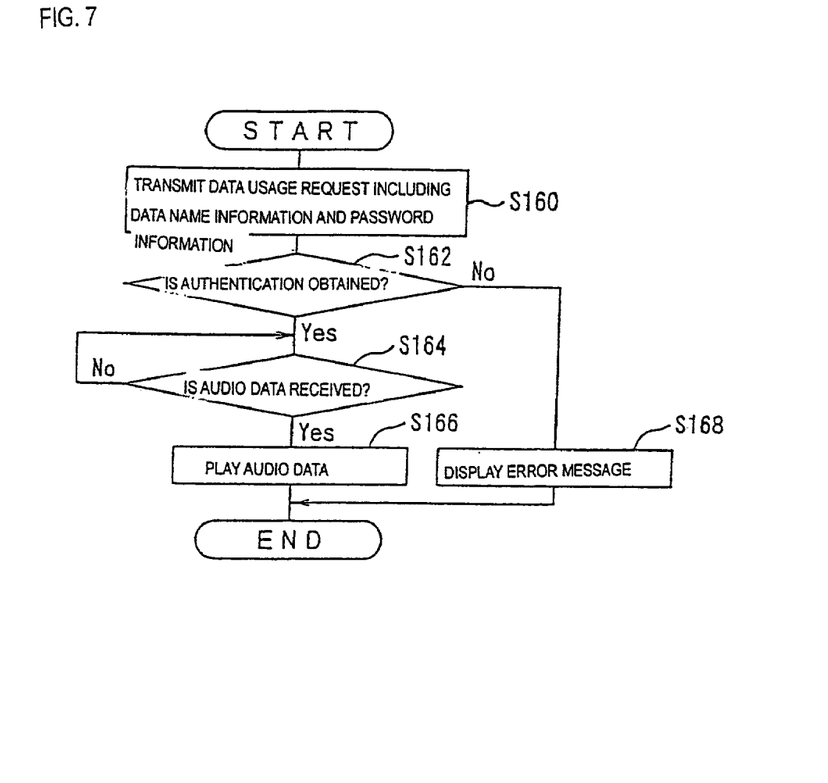
FIG. 7 is a flowchart showing a usage request program.

Referring to FIG. 7, the usage request program in the storage device 42 will now be described in detail. FIG. 7 is a flowchart showing the usage request program.

As in the calling program, the usage request program is a multi-platform program formed of a group of commands that are independent of the type of CPU. The usage request program is read by executing the calling program. When the usage request program is executed by a terminal on the network 500, as shown in FIG. 7, the usage request program proceeds to step S160.

In step S160, the usage request program refers to a network address based on the address information 125 included in the usage certificate data and transmits a data usage request including the data name information 121 and the password information 122 included in the usage certificate data to the database server 100. In step S162, the usage request program determines whether or not authentication from the database server 100 is received. If it is determined that authentication is received (Yes), the usage request program proceeds to step S1164.

In step S1164, the usage request program determines whether or not audio data is received. If it is determined that audio data is received (Yes), the usage request program proceeds to step S166. If it is determined to the contrary (No), the usage request program is queued in step S164 until the audio data is received.

In step S166, the usage request program plays the received audio data, and the usage request program is then terminated.

In contrast, if it is determined in step S162 that no authentication from the database server 100 is received (No), the usage request program proceeds to step S168 and displays an error message. Subsequently, the usage request program is terminated.

Referring back to FIG. 2, the CPU 30 activates a predetermined program stored in a predetermined region of the ROM 32. In accordance with the program, a registration process and a providing process shown in FIGS. 8 and 9, respectively, are executed.

Figure 8:
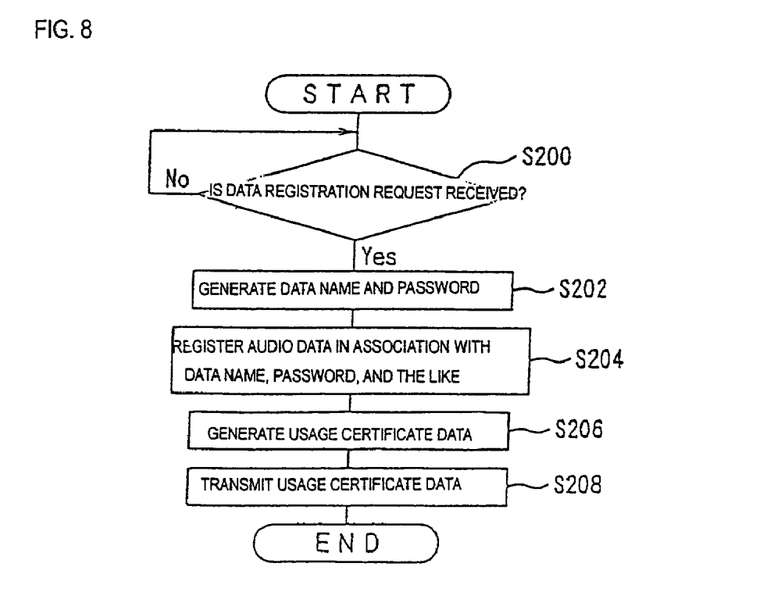
FIG. 8 is a flowchart showing a registration process.

Referring to FIG. 8, the registration process is described in detail. FIG. 8 is a flowchart showing the registration process.

The registration process is a process that registers audio data. When the registration process is executed by the CPU 30, as shown in FIG. 8, the registration process proceeds to step S200. The registration process corresponds to a registration request process executed by the server 200, which will be described hereinafter.

In step S200, the registration process determines whether or not a data registration request is received. If it is determined that the data registration request is received (Yes), the registration process proceeds to step S202. If it is determined to the contrary (No), the registration process is queued in step S200 until it receives a data registration request.

In step S202, the registration process generates a data name and password for audio data included in the received data registration request. In step S204, the registration process registers the audio data included in the received data registration request in the usage certificate data registration table 110 in association with the generated data name, password, usage count, and expiration date. Then, the registration process proceeds to step S206.

In step S206, the registration process generates usage certificate data shown in FIG. 4. In step S208, the registration process transmits the generated usage certificate data to the sender of the data registration request. The registration process is then terminated.

Figure 9:
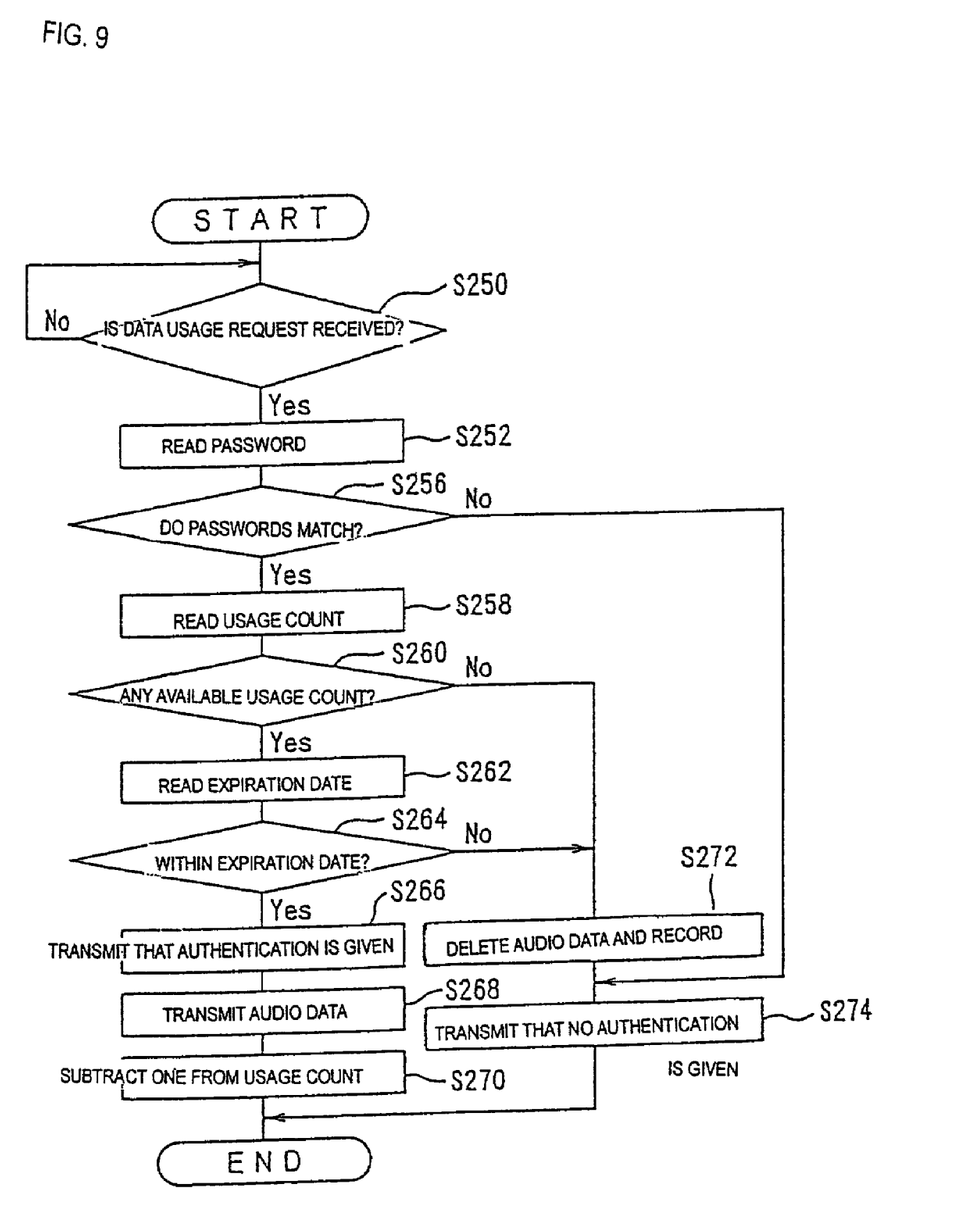
FIG. 9 is a flowchart showing a providing process.

Referring to FIG. 9, the providing process will now be described in detail. FIG. 9 is a flowchart showing the providing process.

The providing process is a process for providing audio data. When the providing process is executed by the CPU 30, as shown in FIG. 9, the providing process proceeds to step S250. The providing process corresponds to the usage request program executed by a terminal on the network 500.

In step S250, the providing process determines whether or not a data usage request is received. If it is determined that a data usage request is received (Yes), the providing process proceeds to step S252. If it is determined to the contrary (No), the providing process is queued in step S250 until it receives a data usage request.

In step S252, the providing process reads a password from a record in which the same data name as that included in the received data usage request is registered from among records in the usage certificate data registration table 110. In step S256, the providing process determines whether or not the read password matches a password included in the received data usage request. If it is determined that the two passwords match (Yes), the providing process proceeds to step S258.

In step S258, the providing process reads a usage count from the record in which the same data name as that included in the received data usage request is registered from among records in the usage certificate data registration table 110. In step S260, the providing process determines whether or not there is a remaining usage count. If it is determined that there is a remaining usage count (Yes), the providing process proceeds to step S262.

In step S262, the providing process reads an expiration date from the record in which the same data name as that included in the received data usage request is registered from among records in the usage certificate data registration table 110. In step S264, the providing process determines whether or not it is within the expiration date. If it is determined that it is within the expiration date (Yes), the providing process proceeds to step S266.

In step S266, the providing process transmits that authentication by the database server 100 is given to the sender of the data usage request. In step S268, the providing process reads audio data from the storage device 42, which is specified by the data name included in the received data usage request, and the providing process transmits the read audio data to the sender of the data usage request. In step S270, the providing process subtracts one from the usage count of the record in which the same data name as that included in the received data usage request is registered from among records in the usage certificate data registration table 110. The providing process is then terminated.

In contrast, if it is determined in step S264 that it is not within the expiration date (No), in step S272, the providing process deletes, from the storage medium 42, the audio data specified by the data name included in the received data usage request. At the same time, the providing process deletes, from the usage certificate data registration table 110, the record in which the same data name as that included in the received data usage request is registered. In step S274, the providing process transmits that no authentication is provided by the database server 100 to the sender of the data usage request. Then, the providing process is terminated.

In contrast, if it is determined in step S260 that no usage count is detected (No), the providing process proceeds to step S272.

In contrast, if it is determined in step 256 that the two passwords do not match (No), the providing process proceeds to step S274.

Figure 10:
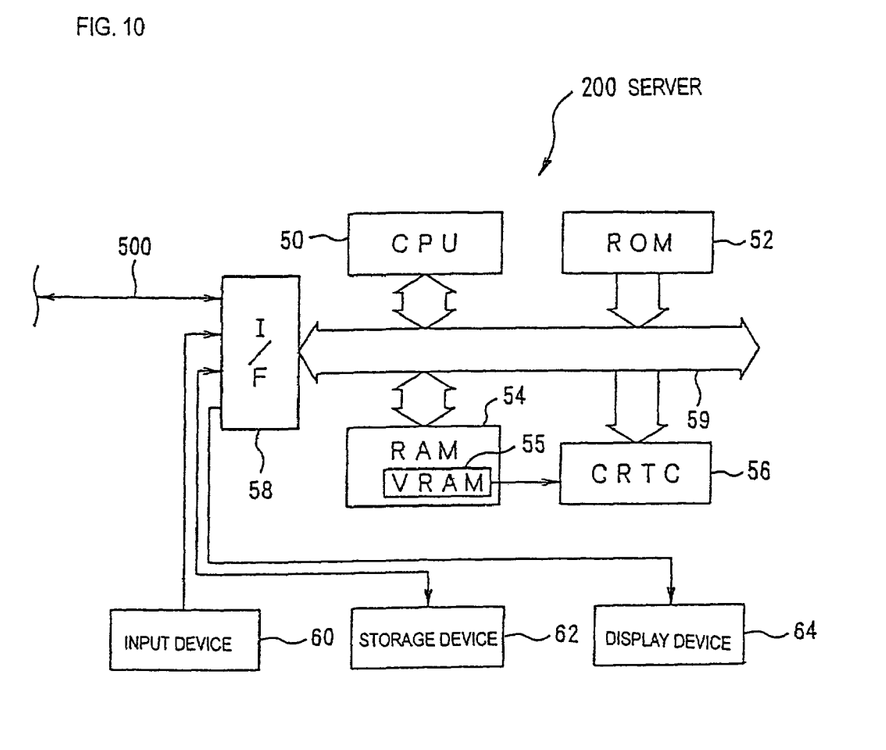
FIG. 10 is a schematic of the structure of a server 200.

Referring to FIG. 10, the structure of the server 200 will now be described in detail. FIG. 10 is a schematic of the structure of the server 200.

As shown in FIG. 10, the server 200 includes a CPU 50 that performs arithmetic operations and controls the overall system in accordance with a control program; ROM 52 that stores in advance the control program for the CPU 50 or the like in a predetermined region; RAM 54 that stores data read from the ROM 52 or the like and the results of the arithmetic operations which are required in the course of operation of the CPU 50; a CRTC 56 that converts data stored in a specific region of the RAM 54 into image signals and outputs the image signals to a display device 64; and an I/F 58 that carries data input and output with respect to external devices. These devices are interconnected by a bus 59, which is a signal line that transmits data, in which data can be communicated among these devices.

The following external devices are connected to the I/F 58. The external devices include an input device 60, which includes a keyboard, a mouse, and the like, that functions as a human interface and inputs data; a storage device 62 that stores data and tables as files; the display device 64 that displays images based on image signals; a signal line that establishes a connection with the network 500; and a signal line that establishes a connection with a POS terminal 202.

Figure 11:
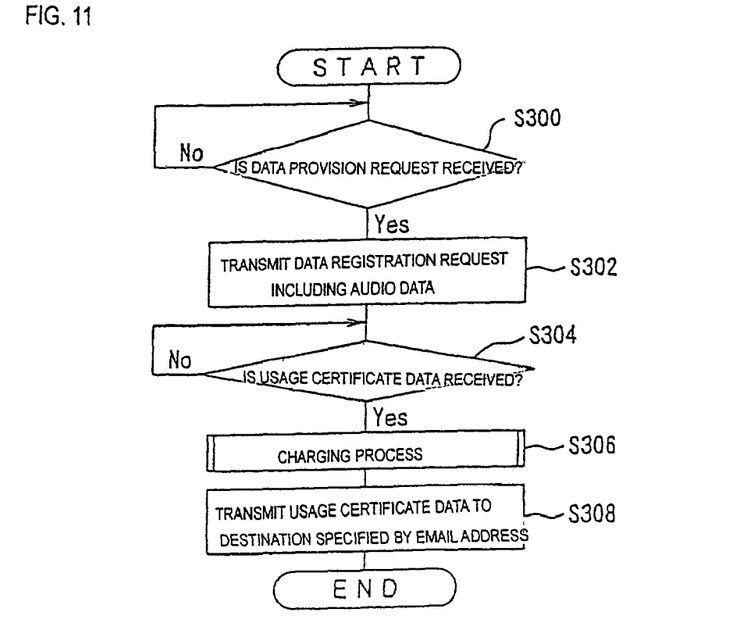
FIG. 11 is a flowchart showing a registration process.

The CPU 50 includes a microprocessing unit MPU or the like. The CPU 50 activates a predetermined program stored in a predetermined region of the ROM 52. In accordance with the program, a registration request process shown in a flowchart in FIG. 11 is executed. FIG. 11 is the flowchart showing the registration process.

The registration request process is a process that requests that audio data be registered. When the registration request process is executed by the CPU 50, as shown in FIG. 11, the registration request process proceeds to step S300.

In step S300, the registration request process determines whether or not a data provision request for requesting that audio data be provided is received. If it is determined that a data provision request is received (Yes), the registration request process proceeds to step S302. If it is determined to the contrary (No), the registration request process is queued in step S300 until it receives a data provision request. A data provision request includes the email address of a destination to which usage certificate data is transmitted and a preferred usage count of audio data.

In step S302, the registration request process transmits a data registration request including the audio data and the preferred usage count to the database server 100. In step S304, the registration request process determines whether or not usage certificate data is received. If it is determined that usage certificate data is received (Yes), the registration request process proceeds to step S306. If it is determined to the contrary (No), the registration request process is queued in step S304 until it receives usage certificate data.

In step S306, a charging process is performed based on the preferred usage count included in the data provision request. Specifically, in step S306, a call charge for the portable terminal 300 (for example, a call charge per minute) is computed. Concerning a result of using the audio data by the portable terminal 100, for example, the charging process refers to a fee calculation table in which a usage fee is defined based on the number of times audio data is used and computes a usage fee in accordance with the result of using the audio data by the portable terminal 100. The computed usage fee is added to the call charge, and the total amount is stored as an amount billed to the user of the portable terminal 300.

In step S308, the usage certificate data is transmitted in the form of an email to a destination specified by the email address included in the data provision request, and the process is then terminated.

The operation of the above-described embodiment will now be described.

First, a case in which audio data is registered in the database server 100 is described.

A user uses the portable terminal 300 to access the seller's server 200 and requests that audio data be provided. For that purpose, the user transmits a data provision request, which includes the email address of the portable terminal 300 and a preferred usage count of the audio data, to the server 200.

When the server 200 receives the data provision request, in step S302, a data registration request including the audio data and the preferred usage count is transmitted to the database server 100.

When the database server 100 receives the data registration request, in steps S202 and S204, the data name and password for the audio data included in the received data registration request are generated. The audio data included in the received data registration request is registered in the usage certificate data registration table 110 in association with the generated data name, password, usage count, and expiration date. In steps S206 and S208, usage certificate data shown in FIG. 4 is generated, and the generated usage certificate data is transmitted to the server 200. The audio data usage count is set to the preferred usage count designated by the user.

When the server 200 receives the usage certificate data, in steps S306 and S308, the charging process is performed based on the preferred usage count included in the data provision request, and the received usage certificate data is transmitted to the portable terminal 300 in the form of an email. Accordingly, the user receives the transmitted usage certificate data.

In this manner, when the user accesses the seller's server 200 and requests that audio data be provided on condition that the user pays a predetermined fee, the audio data is registered in the database server 100. At the same time, usage certificate data that uses the audio data is transmitted to the user's portable terminal 300.

When the user wants to view the contents of the usage certificate data, for example, the user clicks an icon of the usage certificate data or the like. As a result, the portable terminal 300 refers to the program calling information 126 of the usage certificate data, and the calling program is executed. At this time, the user enters a request to display the contents of the usage certificate data using the key panel. In response to this, the calling program refers to the address information 125 of the usage certificate data. Then, the display program is read from the database server 100 and is executed. In steps S130 to S138, the display program displays the contents of the usage certificate data on the LCD. Specifically, the data name, password, usage count, expiration date of the audio data and the network address of the database server 100 are displayed.

A case in which the audio data registered in the database server 100 is played will now be described.

After obtaining usage certificate data, the user may want to play audio data using the portable terminal 300. In this case, for example, the user clicks an icon of the usage certificate data or the like. In response to this, the portable terminal 300 refers to the program calling information 126 of the usage certificate data, and the calling program is executed. At this time, when the user enters a request to play the audio data using the key panel, the calling program refers to the address information 125 of the usage certificate data. Then, the usage request program is read from the database server 100 and is executed. In step S160, the usage request program obtains the data name information 121 and the password information 122 from the usage certificate data, refers to the address information 125 of the usage certificate data, and transmits a data usage request that includes the obtained information to the database server 100.

When the database server 100 receives the data usage request, in step S252, the database server 100 reads, from among records of the usage certificate data registration table 110, a password from a record in which the same data name as that included in the received data usage request is registered. It is then determined whether or not the password included in the received data usage request matches the read password. Since the user has requested to use the audio data based on the authentically issued usage certificate data, it is determined that the password included in the received data usage request and the read password match.

In steps S256 and S258, the usage count is read from the record in which the same data name as that included in the received data usage request is registered, from among records of the usage certificate data registration table 110. Next, it is determined whether or not there is an available usage count. In this example, the user has never played the audio data. Thus, it is determined that there is an available usage count.

In steps S260 and S262, the expiration date is read from the record in which the same data name as that included in the received data usage request is registered, from among records of the usage certificate data registration table 110. Next, it is determined whether or not it is within the expiration date. If it is determined that use of the audio data is within the expiration date, in steps S264 to S268, authentication by the database server 100 is transmitted to the portable terminal 300. The audio data specified by the data name included in the received data usage request is read from the storage device 42, and the read audio data is transmitted to the portable terminal 300.

When the portable terminal 300 receives the audio data, in step S166, the received audio data is played.

By storing the usage certificate data, instead of the audio data itself, in the user's portable terminal 300, the user can play the audio data at any location, if necessary.

If the password included in the received data usage request and the read password do not match, if there is no usage count available, or if it is not within the expiration date, in step S274, the database server 100 transmits that no authentication is given by the database server 100 to the portable terminal 300.

When no authentication is provided by the database server 100, the portable terminal 300 displays an error message in step S168.

According to this embodiment, when the database server 100 receives a data registration request, the database server 100 registers audio data included in the received data registration request in association with the data name information 121, the password information 122, and the like. At the same time, the database server 100 is designed to transmit usage certificate data that includes the information 121 and 122. When the database server 100 receives a data usage request, and when the password of the record in which the same data name as that included in the received data usage request is registered matches a password included in the received data usage request, the database server 100 is designed to transmit audio data specified by the data name included in the received data usage request to the portable terminal 300.

By storing the usage certificate data, in place of the audio data itself, in the portable terminal 300, the user can play the audio data at any place if necessary. Thus, it is possible to use the audio data without occupying a large amount of the data capacity of the portable terminal 300.

According to this embodiment, the database server 100 registers the audio data included in the received data registration request in association with the usage count information 123. When the record in which the same data name as that included in the received data usage request is registered has an available usage count, the database server 100 transmits the audio data specified by the data name included in the received data usage request to the portable terminal 300. If the record has no usage count available, transmission of the audio data is prohibited.

Accordingly, the seller can restrict the number of times the user uses the audio data. The seller presets the usage count in accordance with a fee paid by the user. Thus, the seller can offer a service allowing the user to use data within the range of the usage count.

According to this embodiment, the usage certificate data includes a network address that uniquely specifies the location of the database server 100 on the network 500.

By referring to the network address included in the usage certificate data, the portable terminal 300 can transmit a data usage request to the database server 100. Therefore, the convenience of using the audio data is enhanced.

According to this embodiment, the usage certificate data includes a network address that uniquely specifies, on the network 500, the location at which the usage request program that transmits the data usage request to the database server 100 is stored.

By referring to the network address included in the usage certificate data, the portable terminal 300 can read the usage request program from the database server 100 and transmits, using the usage request program, the data usage request to the database server 100. As a result, it becomes even more convenient to use the audio data.

According to this embodiment, the usage certificate data includes the usage count of the audio data.

Thus, the user can determine, from the portable terminal 300, the number of times the audio data can be played. It thus becomes more convenient to use the audio data.

According to this embodiment, the audio data included in the received data registration request is registered in association with the expiration date information 124. If it is within the expiration date of the record in which the same data name as that included in the received data usage request is registered, the audio data specified by the data name included in the received data usage request is transmitted to the portable terminal 300. If it is not within the expiration date, transmission of the audio data is prohibited.

Thus, the seller can impose a time limit on using, by the user, the audio data.

According to this embodiment, the usage certificate data includes the expiration date of the audio data.

Thus, the user can determine, from the portable terminal 300, the period in which the audio data can be played. It thus becomes more convenient to use the audio data.

According to this embodiment, the usage certificate data includes the program calling information 126 that is necessary to call a program that transmits a data usage request to the database server 100 based on the usage certificate data. Based on the program calling information 126, the multi-platform display program or the multi-platform usage request program is read from the database server 100 and is executed.

By clicking the icon of the usage certificate data or the like, the contents of the usage certificate data are displayed or the audio data is played. It thus becomes more convenient to use the audio data.

According to this embodiment, the audio data corresponds to usage data. The data name information 121 and the password information correspond to authentication information. The storage device 42 corresponds to the storage device. Steps S200 to S208 correspond to the registration device. Steps S250 to S274 correspond to the providing device.

According to this embodiment, the database server 100 is designed to transmit usage certificate data to the sender of a data registration request. However, the present invention is not limited to this embodiment. When a network address is included in a data registration request, the usage certificate data is transmitted to a destination specified by the network address. When no network address is included in a data registration request, the usage certificate data is transmitted to the sender of the data registration request.

When the server 200 transmits a data registration request including a network address, such as the email address of the user to the database server 100, the usage certificate data can be transmitted to the portable terminal 300 without passing through the server 200. Compared with a case in which the usage certificate data is transmitted via the server 200 to the portable terminal 300, the server 200 is relieved of the burden of retransmitting the usage certificate data to the portable terminal 300. It is also possible to reduce the possibility of the usage certificate data being transmitted to another terminal by mistake. Furthermore, the possibility of the usage certificate data being tapped by a third party during transmission is reduced.

According to this embodiment, the database server 100 is designed to transmit audio data to the sender of a data usage request. However, the present invention is not limited to this embodiment. When a network address is included in a data usage request, the audio data is transmitted to the destination specified by the network address. When no network address is included in a data usage request, the audio data is transmitted to the sender of the data usage request.

According to this embodiment, the audio data is restricted by the usage count, and hence the audio data can be played within the range of the preset usage count. However, the present invention is not limited to this embodiment. Instead of restricting the audio data using the usage count, it is possible to play the audio data any number of times.

According to this embodiment, the present invention is applied to a case in which the audio data is played. However, the present invention is not limited to this embodiment. It is also possible to apply the present invention to cases of printing various data such as: a resident card, a copy of a family register, a medical certificate, and other types of certificates; a railway ticket, an admission ticket, and other types of securities; a photograph of a celebrity, a photograph of a famous landscape or building, and other types of photographs; and a drawing, book, or other types of literary works by another person. Also, the present invention is applicable to cases in which video data for a movie is played or music data for karaoke is played by a karaoke apparatus. In these cases, it is assumed that numerous free duplications of such data by a user will cause inconvenience. Thus, the significance of restricting the usage count as in the present invention is very profound.

According to this embodiment, a case in which the display program and the usage request program shown in the flowcharts in FIGS. 6 and 7 are stored in the database server 100 has been described. However, the present invention is not limited to this embodiment. It is also possible to store the programs in another terminal on the network 500.

According to this embodiment, a case has been described in which, when executing the display program and the usage request program shown in the flowcharts in FIGS. 6 and 7, the programs are read from the database server 100 and are executed. However, the present invention is not limited to this embodiment. It is also possible to store the programs beforehand in a main storage device, such as a ROM or in an auxiliary storage device, such as a HD of the executing terminal, and the programs can be read into a RAM or the like and be executed.

According to this embodiment, when performing the registration process and the providing process shown in the flowcharts in FIGS. 8 and 9, a case has been described in which the control program which is stored beforehand in the ROM 32 is executed. However, the present invention is not limited to this embodiment. It is also possible to read a program that performs the processes, which is stored in a storage medium, into the RAM 34 and to execute the program.

According to this embodiment, when performing the registration request process shown in the flowchart in FIG. 11, a case has been described in which the control program which is stored beforehand in the ROM 52 is executed. However, the present invention is not limited to this embodiment. It is also possible to read a program that performs the process, which is stored in a storage medium, into the RAM 54 and to execute the program.

The storage medium includes a semiconductor storage medium, such as a RAM, ROM, or the like, a magnetic storage medium, such as an FD, HD, or the like, an optically-read storage medium, such as a CD, CDV, LD, DVD, or the like, or a magnetic/optically-read storage medium, such as an MO or the like. Regardless of the reading method such as electronic, magnetic, or optical reading, the storage medium includes any type as long as it is a computer-readable storage medium.

According to this embodiment, a data management apparatus, a storage medium having stored therein a data management program, a storage medium having stored therein usage certificate data, and a method of using data according to the present invention have been applied to a case in which, as shown in FIG. 1, a user uses a music delivery service offered by a seller to play audio data using the user's portable terminal 300. However, the present invention is not limited to this embodiment. The present invention is also applicable to other cases included within the scope of the present invention.

As described above, according to the data management apparatus of the present invention, a user can use data at any location, if necessary, by storing usage certificate data, instead of the data itself, in a user's terminal. Thus, it is possible to use the data without occupying a large amount of the data capacity of the terminal. In particular, it is highly advantageous to apply the present invention to a case in which a large amount of data, such as audio data, is used.

Furthermore, according to the data management apparatus of the present invention, a provider can restrict the number of times a user can use data. Thus, it is advantageous to apply the present invention to a case in which the provider presets the number of times the user can use data in accordance with a fee paid by the user, thus allowing the user to use the data within the range of the preset usage count. Also, the present invention is advantageous when it is applied to reducing the possibility of data, which has the property of a certificate or the like, being duplicated a large number of times or being falsified.

Furthermore, according to the data management apparatus of the present invention, a terminal that has usage certificate data refers to a network address included in the usage certificate data, thus transmitting a data usage request to the data management apparatus. Accordingly, the convenience of using the data is further enhanced.

Furthermore, according to the data management apparatus of the present invention, a terminal that has usage certificate data refers to a network address included in the usage certificate data, thus reading a program from within a network. Using the program, the terminal can transmit a data usage request to the data management apparatus. It is thus possible to further enhance the convenience of using the data.

Moreover, according to the data management apparatus of the present invention, a terminal that is to register data transmits a data registration request including the network address of a user's terminal to the data management apparatus. As a result, not only the burden of retransmitting usage certificate data to the user's terminal is lessened, but also the possibility of usage certificate data being transmitted to another terminal by mistake, is reduced. It is also possible to reduce the possibility of the usage certificate data being tapped by a third party during transmission.

According to a storage medium having stored therein a data management program of the present invention, advantages equivalent to those of the data management apparatus discussed above can be obtained.

According to a storage medium having stored therein usage certificate data of the present invention, advantages equivalent to those of a data management apparatus described above can be obtained.

According to the method of using data of the present invention, a user can use data at any place if necessary by storing usage certificate data, in place of the data itself, in a user's terminal. It is thus possible to use the data without occupying a large amount of space of the data capacity of the terminal. In particular, it is highly advantageous to apply the present invention to a case in which large data, such as audio data, is used.

According to the method of using data of the present invention, a provider can restrict the number of times a user can use data. Thus, it is advantageous to apply the present invention to a case in which the provider presets the number of times the user can use data in accordance with a fee paid by the user, thus allowing the user to use the data within the range of the preset usage count. Also, the present invention is advantageous when it is applied to reducing the possibility of data, which has the property of a certificate or the like, being duplicated a large number of times or being falsified.

What is claimed is:

1. A data management apparatus for registering usage data, in response to a data registration request, which includes the usage data to be used, from a usage data provider at the time of a usage data provision request to the usage data provider from a user, and for providing, in response to a data usage request from the user, the usage data regarding the data usage request, comprising:

a registration device that registers the usage data in a storage device; and a providing device that provides the usage data in said storage device;

such that, when the data registration request is received, said registration device registers the usage data included in the received data registration request in said storage device, in association with authentication information for authenticating whether or not a user is eligible to use the usage data, and said registration device transmits usage certificate data which includes the authentication information; and when the data usage request which includes the authentication information is received, and when the authentication information in said storage device which corresponds to the usage data regarding the received data usage request and the authentication information included in the received data usage request satisfy a predetermined relationship, said providing device transmits the usage data in said storage device regarding the received data usage request.

2. The data management apparatus according to claim 1, said registration device registering the usage data included in the received data registration request in said storage device, in association with usage count information which indicates the number of times the usage data is permitted to be used; and when a usage count in the usage count information in said storage device which corresponds to the usage data regarding the received data usage request is less than or equal to a predetermined number, said providing device being prohibited from transmitting the usage data.

3. The data management apparatus according to claim 1, the usage certificate data further including a network address that uniquely specifies the location of the apparatus on a network to which the apparatus is connected.

4. The data management apparatus according to claim 1, the usage certificate data further including a network address that uniquely specifies, on a network, the storage location of a program that transmits the data usage request which includes the authentication information to the apparatus, the program being stored in the network.

5. The data management apparatus according to claim 1, when a network address is included in the data registration request, said registration device transmitting the usage certificate data to a destination specified by the network address, and, when no network address is included in the data registration request, said registration device transmitting the usage certificate data to the sender of the data registration request.

6. The data management apparatus according to claim 1, when a network address is included in the data usage request, said providing device transmitting the usage data to a destination specified by the network address, and, when no network address is included in the data usage request, said providing device transmitting the usage data to the sender of the data usage request.

7. A computer-readable storage medium having stored therein a data management program to be applied to the data management apparatus as set forth in claim 1, comprising:

a program for causing a computer to perform processing implemented by the registration device that registers usage data in the storage device and processing implemented by the providing device that provides the usage data in said storage device;

such that, when a data registration request is received, said registration device registers the usage data included in the received data registration request in said storage device, in association with authentication information to authenticate whether or not a user is eligible to use the usage data, and said registration device transmits usage certificate data which includes the authentication information; and when a data usage request which includes the authentication information is received, and when the authentication information in said storage device which corresponds to the usage data regarding the received data usage request and the authentication information included in the received data usage request satisfy a predetermined relationship, said providing device transmits the usage data in said storage means regarding the received data usage request.

8. A computer-readable storage medium having stored therein usage certificate data to be transmitted by the data management apparatus as set forth in claim 1, comprising:

a program for storing authentication information that authenticates, by said data management apparatus, whether or not a user is eligible to use the usage data and a network address that uniquely specifies, on a network, the storage location of a program for transmitting a data usage request which includes the authentication information to said data management apparatus, the program being stored in the network.

9. A method of using data by a computer system, comprising:

providing usage data with a provider, the providing step including: registering the usage data, in response to a data registration request, which includes the usage data to be used, from a usage data provider at the time of a usage data provision request to the usage data provider from a user, in a storage device in association with authentication information that authenticates whether or not a user is eligible to use the usage data, and transmitting usage certificate information which includes the authentication information to the user of the usage data;

the user, receiving the usage certificate data, and transmitting a data usage request which includes the authentication information;

the provider receiving the data usage request, and transmitting the usage data in said storage device regarding the received data usage request when the authentication information in said storage device which corresponds to the usage data regarding the received data usage request and the authentication information included in the received data usage request satisfy a predetermined relationship.

10. The method of using data according to claim 9, the providing step further including: registering the usage data in said storage device in association with usage count information which indicates the number of times the usage data is permitted to be used; and prohibiting transmission of the usage data when a usage count in the usage count information in said storage device which corresponds to the usage data regarding the received data usage request is less than or equal to a predetermined number.

11. The data management apparatus according to claim 1, said registration device transmitting usage certificate data to the usage data provider and the usage data provider transmitting said usage certificate data to the user.

12. The method of using data according to claim 9, further comprising transmitting usage certificate data to the usage data provider, the usage data provider transmitting the usage certificate data to the user.

* * * * *